US00RE42888E

(19) United States
(12) Reissued Patent
Crick

(10) Patent Number: US RE42,888 E
(45) Date of Reissued Patent: Nov. 1, 2011

(54) PAPER-SCORING APPARATUS

(75) Inventor: Diana S. Crick, Surrey (CA)

(73) Assignee: Scor-Pal Products Ltd., Surrey (CA)

(21) Appl. No.: 13/032,140

(22) Filed: Feb. 22, 2011

Related U.S. Patent Documents

Reissue of:
(64) Patent No.: 7,753,833
Issued: Jul. 13, 2010
Appl. No.: 12/128,446
Filed: May 28, 2008

(51) Int. Cl.
*B31B 1/25* (2006.01)
(52) U.S. Cl. ..... 493/396; 493/397; 493/59; 493/160
(58) Field of Classification Search ..... 493/396, 493/397, 399, 59, 58, 160
See application file for complete search history.

(56) References Cited

U.S. PATENT DOCUMENTS

| | | | |
|---|---|---|---|
| 811,787 | A | 2/1906 | Monske |
| 1,153,951 | A | 9/1915 | Plante |
| 1,221,213 | A | 4/1917 | Plante |
| 4,122,827 | A | 10/1978 | Rhodes |
| 4,443,198 | A | 4/1984 | Ehsanipour |
| 5,378,222 | A | 1/1995 | Weber |
| 5,380,265 | A | 1/1995 | Giovinazzo |
| 5,383,503 | A | 1/1995 | Johnson |
| 5,484,373 | A | 1/1996 | Carbone |
| 5,733,237 | A | 3/1998 | Marschke |
| 5,845,409 | A | 12/1998 | Kimoto |
| 5,855,543 | A | 1/1999 | Carbone |
| 6,349,639 | B1 | 2/2002 | Smith |
| 6,612,433 | B2 | 9/2003 | McKenzie |
| 6,695,758 | B2 | 2/2004 | Dostie |
| 6,872,177 | B1 | 3/2005 | Fullington |
| 7,464,480 | B2 | 12/2008 | Vetromila |
| 2003/0073556 | A1 | 4/2003 | Carbone |
| 2003/0118689 | A1 | 6/2003 | Carlson |
| 2007/0209212 | A1 | 9/2007 | Vick |
| 2007/0254794 | A1 | 11/2007 | Johnson |

*Primary Examiner* — Sameh H. Tawfik
(74) *Attorney, Agent, or Firm* — Christensen O'Connor Johnson Kindness PLLC

(57) ABSTRACT

Groove-type paper scoring apparatus according to the invention comprises a platform providing a planar rectangular work surface. On the platform are a series of transversely spaced shallow score channels extending longitudinally from one end of the platform to the other. Shallow boundary walls extend along the side edges and the distal end of the platform. The distal end wall of the platform is provided with spaced vertical notches each mating with an associated one of the series of score channels. A scale or ruler extends along each of the walls.

22 Claims, 5 Drawing Sheets

PAPER-SCORING APPARATUS

Matter enclosed in heavy brackets [ ] appears in the original patent but forms no part of this reissue specification; matter printed in italics indicates the additions made by reissue.

FIELD OF THE INVENTION

The invention herein described relates generally to groove-type apparatus for scoring paper (typically cardstock) so as to provide fold lines or creases. Such apparatus is used, for example, for facilitating the home manufacture of greeting cards.

BACKGROUND OF THE INVENTION

Paper-scoring apparatus for home and small-business use falls into two quite different categories. One category is the ridge-type scoring device, which has spaced parallel sharp raised linear ridges on a working platform. This type requires the use of a scoring tool having a distal fork mating with the cross-sectional shape of the ridge. The other type is the groove type, having parallel linear grooves or channels on a working platform. This type requires the use of a scoring tool having a distal point that can force the paper sheet part way into the groove, creating a fold line or crease. The present invention lies in the latter category.

The paper scoring art is well developed and has undergone evolution over approximately a century; by way of example, see Plante U.S. Pat. No. 1,153,951 issued on 21 Sep. 1915. This patent discloses and illustrates a classic ridge-type scoring device and a scoring tool for use therewith having a forked distal portion for engaging the sharp linear scoring ridges of the device.

All prior paper scoring devices suffer from various disadvantages associated with structural limitations, inadequate versatility, user unfriendliness, etc.

SUMMARY OF THE INVENTION

In this specification and the appended claims, "paper" means sheet material to which one or more fold creases are to be imparted. The selected sheet material will typically be cardstock, which is used herein as a typical example, but often light cardboard or double-sided decorator paper is used.

Paper scoring apparatus according to the invention is of the groove type rather than the sharp-ridge type. Such apparatus comprises a. a platform providing a substantially planar rectangular work surface;

b. a series of transversely spaced shallow score channels (grooves) of substantially uniform breadth and depth extending longitudinally from the distal end of the work surface to the proximal end of the work surface; and c. shallow boundary walls extending upwardly from and along the side edges and the distal end of the platform.

"Distal" and "proximal" are with respect to the user. When the apparatus is in use, the distal end of the platform is more remote from the user; the proximal end closer to the user.

In a preferred embodiment of the inventive apparatus, the distal end boundary wall of the platform is provided with a series of spaced generally vertical notches each mating with an associated one of the series of score channels. The notches extend upward from the distal ends of corresponding score channels. This design feature facilitates score tool penetration of the paper at the distal end of the selected score channel.

The score channels or grooves are dimensioned for ease of use, having due regard to the expected thickness of the cardstock (say) with which the device will be used. The point of the complementary scoring tool is dimensioned for compatiblity with the score channels and cardstock expected to be used. The point of the scoring tool is typically not a true point, but a rounded point so that the paper is not pricked by the point of the tool. It is partly for this reason that the notches are provided so that the working edge of the rounded point is able to reach the distal end of each groove. It is convenient for some purposes to have the score channels wide enough that they can be used for reverse-embossing the cardstock for ornamental purposes.

The platform of the inventive paper scoring apparatus is of a suitable length and width selected for use with rectangular paper of a known dimension. In America, cardstock is typically 8.5"×11". Accordingly, a suitable platform may conveniently be 12"×12", permitting placing cardstock onto and removal of cardstock from the platform with ease, for both portrait and landscape orientations of the cardstock on the platform, for both left-handed and right-handed users.

Paper scoring apparatus of the aforementioned general type may be provided with a scale along one or more walls. Optimally, at least the distal end wall of the inventive apparatus is provided with a scale, and each sidewall may also be provided with a scale. The scale displays length in selected units of length, which in America is typically inches.

For convenience of use, including reading of scales, the boundary walls for the platform are of substantially uniform height, the tops of the boundary walls are generally parallel to the platform, and the scales are located on or in the vicinity of the tops of the boundary walls.

Conveniently, at least some of the score channels are spaced from one another in multiples or fractions of the selected unit of length. For example, most of the score channels could be placed one-half inch apart, and would be aligned with half-inch markings on the distal end wall scale.

Additional score channels may be provided for special purposes, such as folding a sheet of cardstock into thirds. Preferably marks are provided along the distal end boundary wall of the platform in the vicinity of the distal ends of such additional score channels, for identifying those score channels that are suitable for use in making predetermined preferred scoring.

The preferred method of manufacture of paper scoring apparatus according to the invention is not part of the invention. Conventional molding and forming techniques may be applied to suitable plastics material which in use is relatively strong and rigid. The inventive device may be an integral plastics device manufactured in a single mold. To facilitate extrication of the device from the mold, selected surfaces may be slightly inclined rather than strictly perpendicular to adjacent surfaces. Terms such as "generally vertical" should be read with the foregoing in mind, and on the premise that in normal use, the platform will be horizontal or nearly so. To facilitate a light weight of the apparatus while maintaining adequate strength, spaced reinforcing ribs may be provided on the underside of the platform, each rib underlying an associated groove, for strengthening the platform in the vicinity of the associated groove. Additional oblique ribs may also be provided on the underside of the platform for strengthening the platform while maintaining overall light weight of the scoring device.

DETAILED DESCRIPTION

Figure 1:
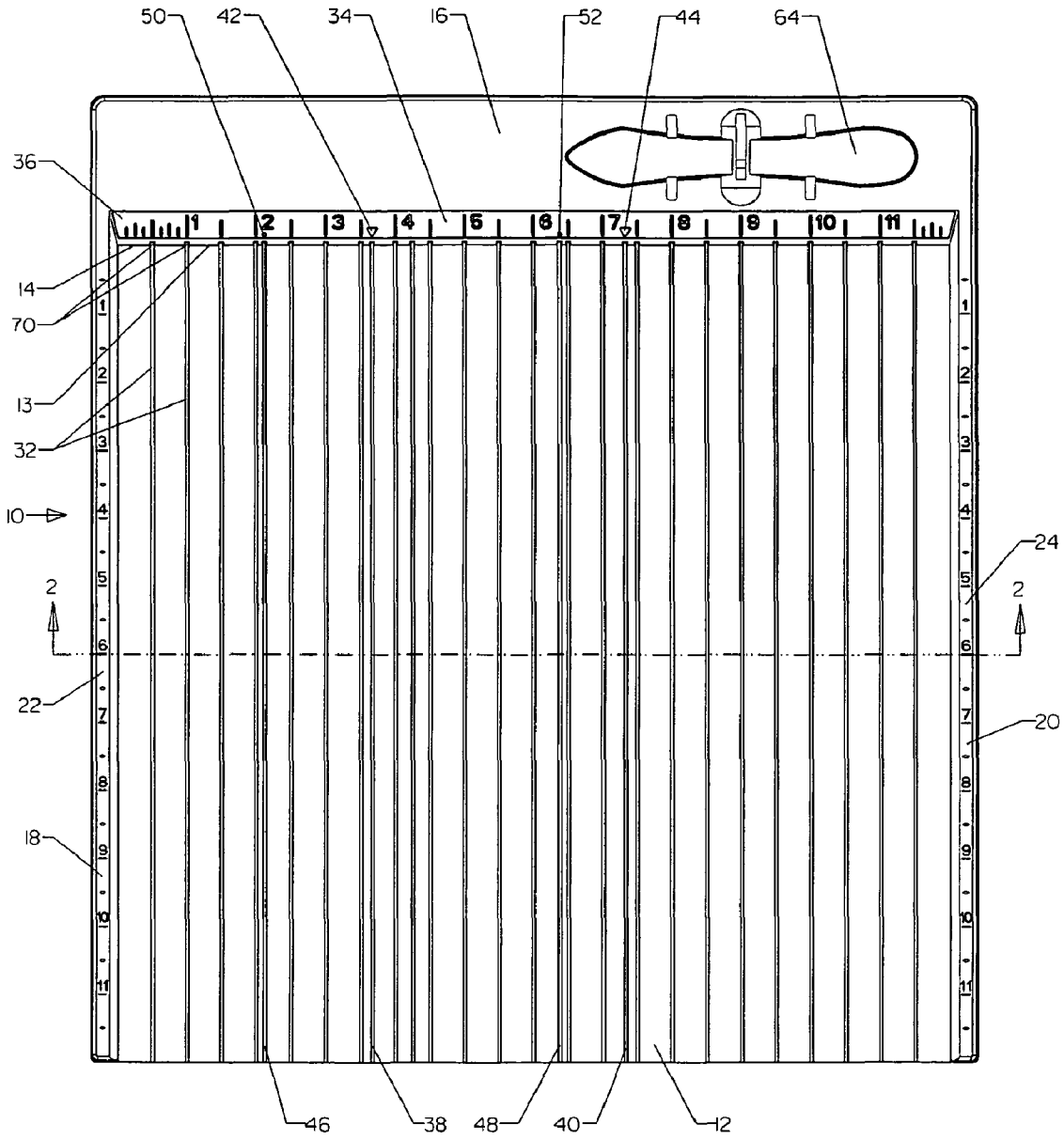
FIG. 1 is a plan view of a preferred embodiment of the paper scoring device according to the invention.
Figure 2:
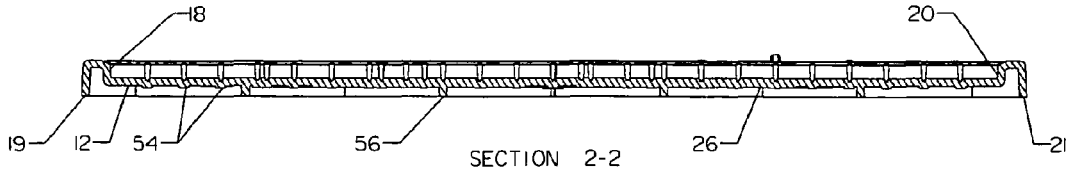
FIG. 2 is a section elevation view of the device of FIG. 1, taken along the section line 2-2 in FIG. 1.
Figure 3:
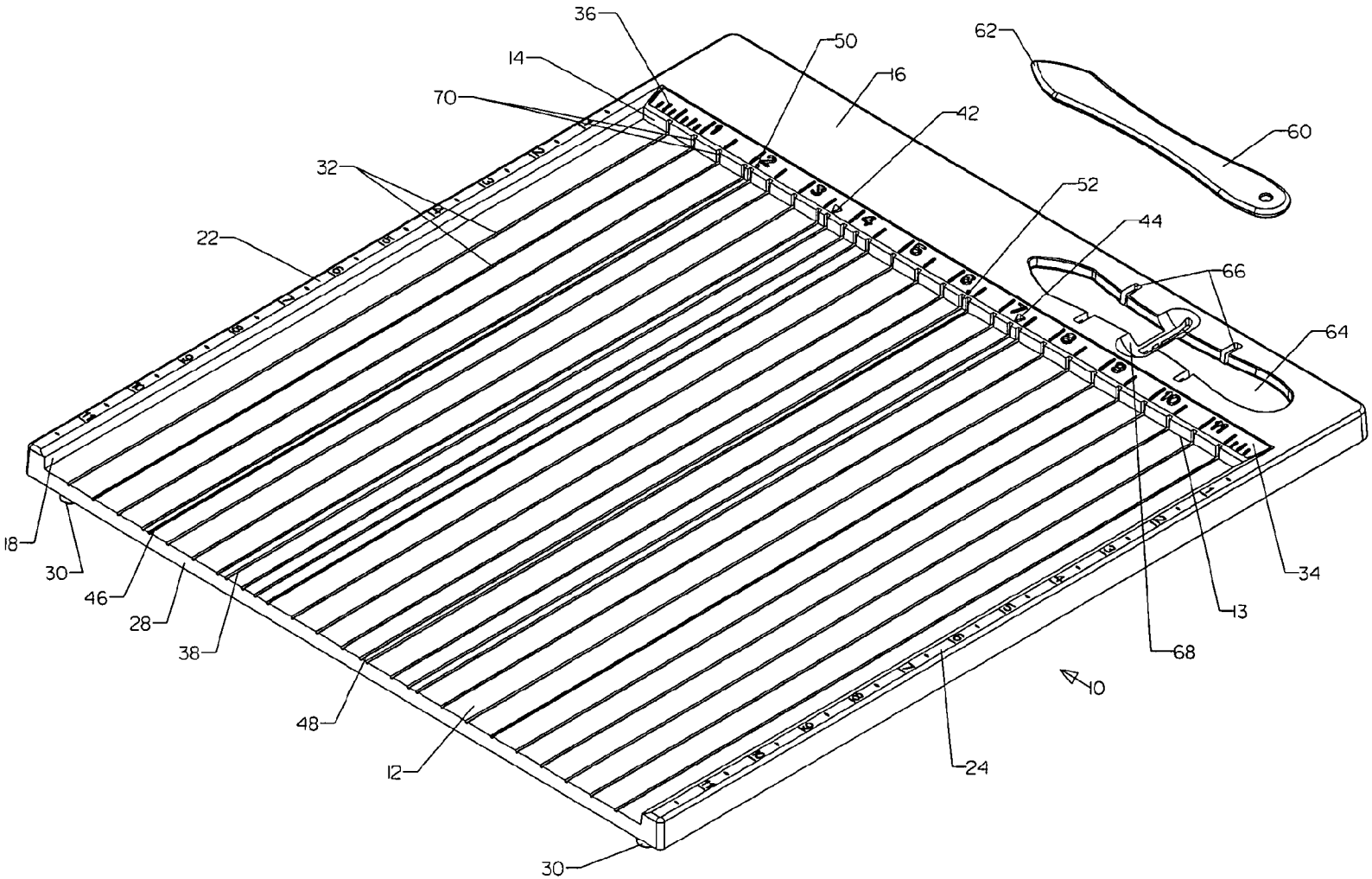
FIG. 3 is an isometric view of the device of FIG. 1 accompanied by a scoring tool suitable for use therewith.
Figure 4:
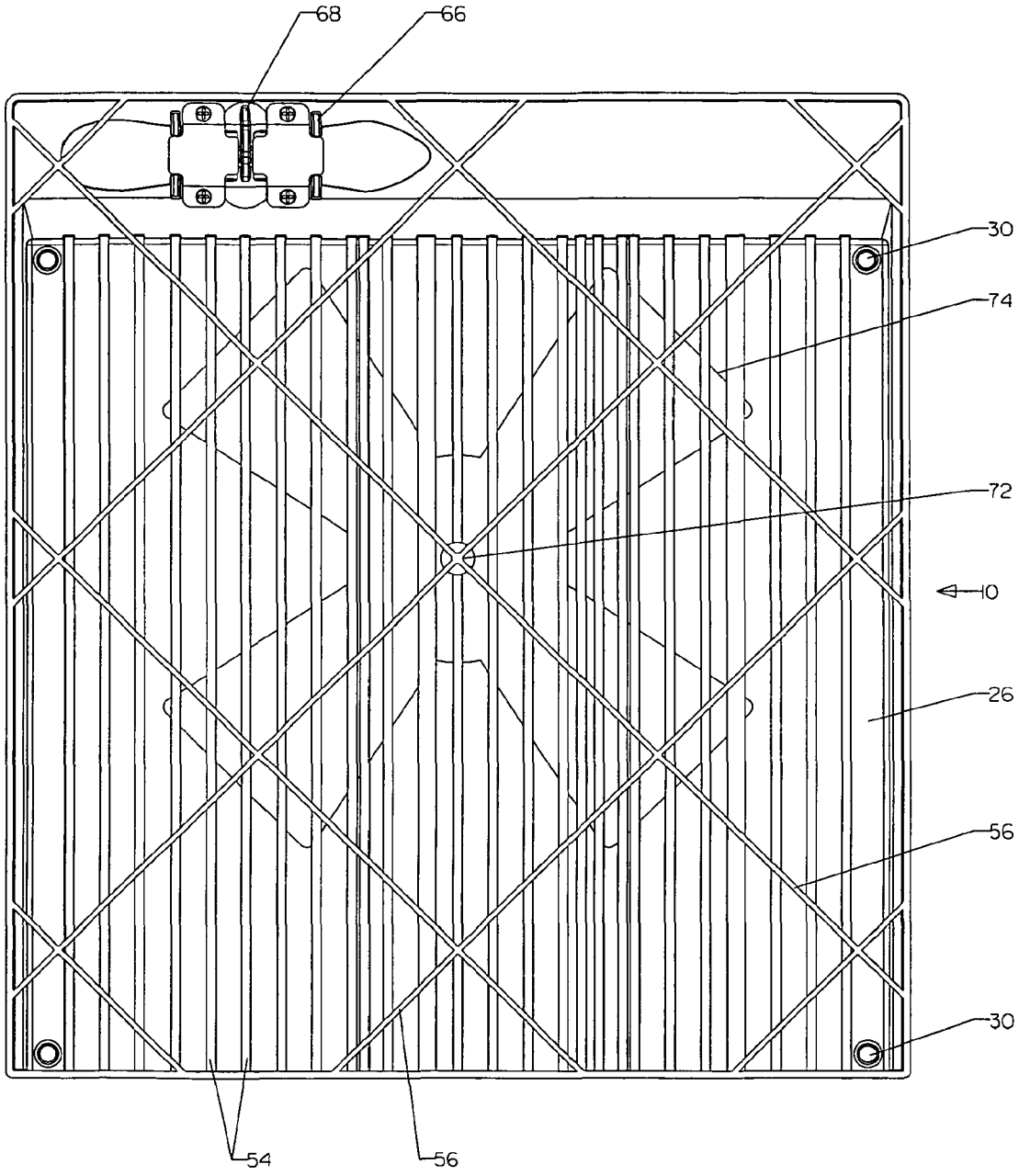
FIG. 4 is a plan view of the underside of the device of FIG. 1.
Figure 5:
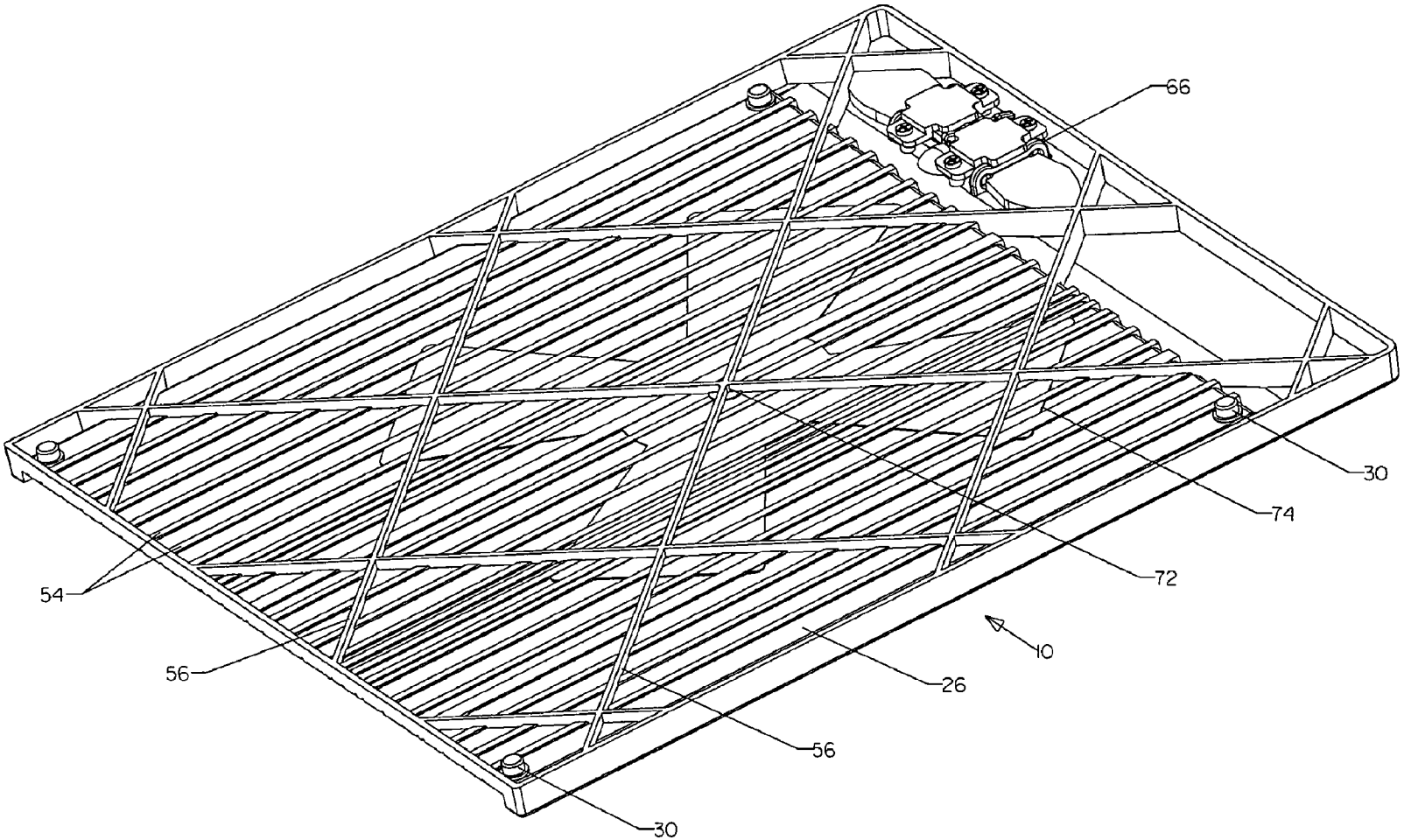
FIG. 5 is an isometric view of the device of FIG. 1 viewed from its underside.

This description is of a preferred embodiment of the paper scoring device according to the invention, and as such includes mention of desirable design features in addition to those that relate to the invention per se.

This embodiment generally indicated as 10 is preferably formed from sturdy plastics material. It comprises a platform 12 bounded at its distal end 13 by an end wall 14 formed in a deck 16 and along its sides by sidewalls 18, 20. (The term "fence" is sometimes used in the industry in preference to "sidewall".) The upper surfaces of the sidewalls 18, 20 are preferably coplanar with the upper surface of the deck 16. The sidewalls 18, 20 are preferably narrow but their upper surfaces are preferably wide enough to present linear scales 22, 24 demarcated in inches or centimetres.

(The terms "distal" and "proximal" in this description, when referring to the device 10 or the platform 12 or portions thereof, are used with respect to the body of the user of the device. The deck 16 and end wall 14 are remote from the user, and therefore are distally located, whilst the end 28 of the platform 12 is close to the user, and is therefore proximally located.)

The platform 12 may be integral with the sidewalls 18, 20 and may be suspended above any suitable supporting surface (not shown) such as a table top by having the outermost portions of each of the sidewalls 18, 20 extend downward below the undersurface 26 of the platform 12. The lower edges 19, 21 of the sidewalls 18, 20 are coplanar and may be parallel to the platform 12 as illustrated or, if desired, could be given a slight inclination so that the distal end 13 of the platform 12 rests at a higher level than its proximal end 28. Pedestals 30 at the corners of the paper scoring device 10 may be of rubber or the like to provide non-scratching frictional engagement between the device 10 and the supporting surface on which it rests.

Between the proximal edge of the deck 16 and the end wall 14; i.e. distally of the distal edge of the platform 12, is a transverse bevelled surface 34 on which a linear scale 36 is displayed, demarcated in inches or centimetres, the zero point on the scale coinciding with the left edge of the platform 12, i.e. coincident with the distal end of the inner surface of the left sidewall 18. The bevelling of the scale 36 facilitates visual alignment of a scoring tool with a selected groove 32.

Parallel shallow scoring grooves, two exemplary ones of which are designated by reference numeral 32, extend longitudinally from the distal end 13 to the proximal end 28 of the platform 12. Conveniently, many of the neighboring grooves are spaced apart by a standard unit of measurement, e.g. by 0.5 in. or by 1.0 cm, and are correspondingly aligned with divisions of the scale 36. Others of the grooves may be placed for specific folding purposes. In the illustrated embodiment, the sidewalls 18, 20 are 12 in. apart. Assuming a standard letter-size cardstock of 8.5 in.×11 in., grooves 38, 40 are located at transverse distances of 3⅔ in. and 7⅓ in. respectively from the left end (zero point) of the scale 36 so that when such standard sheet is placed in landscape orientation, i.e. with its longer edge against the end wall 14 and its shorter edge against the sidewall 18, the grooves 38, 40 divide the sheet into three equal portions lengthwise—i.e., the 11-inch length of the cardstock is divided into thirds when a scoring tool is run along the cardstock at the grooves 38 and 40. Grooves 38, 40 are aligned with triangular marks 42, 44 on the scale 36 for ease of recognition by the user. Similarly, grooves 46, 48 are respectively aligned with dots 50, 52 at 2.125 in. and 6.375 in. along the scale 36, for the purpose of forming a standard gate fold in a sheet of standard cardstock positioned in portrait orientation with the short edge of the cardstock placed against end wall 14 and the long edge against the inner surface of the sidewall 18. Other special-purpose marks and corresponding grooves could be provided at the designer's discretion.

To combine light weight with strength, the platform 12 is formed as a relatively thin sheet with reinforcing longitudinally extending ribs 54 underlying the grooves 32, and with spaced oblique supporting ribs 56 whose lower edges are aligned with the lower edges 19, 21 of sidewalls 18, 20 providing additional support for the platform 12 when it rests on an underlying supporting surface.

A suitably formed scoring tool 60 whose distal working end 62 is formed as a rounded "point", is dimensioned so that the working end 62 of the tool 60 forces cardstock into a groove 32 when the tool is pressed down against the cardstock and run longitudinally along the cardstock in alignment with the underlying groove 32. A receptacle in the nature of a shallow cavity 64 is located on the right side of the deck 16. The walls of the cavity 64 mate with the edges of the tool 60. Resilient clips 66 retain the tool 60 in the cavity 64 when the tool 60 is not in use. A spring-loaded flip mechanism 68, when triggered by finger depression, forces the tool 60 upwards out of engagement with the retaining clips 66. The provision of a retaining receptacle for the tool 60 is not part of the present invention, nor are the details of the flip mechanism.

To facilitate the initial positioning of the working end 62 of the scoring tool 60 at the distal end of a given groove 32, so that the most distal working edge of the tool 60 may reach the distal limit of any of the grooves 32, the end wall 14 is provided with a series of spaced notches or indentations 70, each aligned with an associated groove 32. This design feature permits the user to know where each groove 32 begins, even when the groove is covered by cardstock, and to position the tip 62 of the scoring tool 60 at or very close to the distal limit of the groove 32. The notches 70 also facilitate the commencement of scoring the cardstock at that distal limit.

Expanding on the feature discussed in the foregoing paragraph, the "point" of a scoring tool is typically not a sharp point but is rounded. There are at least three good reasons for this, viz (i) a sharp point is more likely to pierce the cardstock (say), which normally is not desired; (ii) a rounded point enables an effective contact between the scoring tool and the cardstock over the range of angles of tool to platform that may be expected in use; and (iii) a sharp point is more likely to break off than a rounded point. The scoring tool 60 illustrated in the drawings has a rounded "point".

Figure 6:
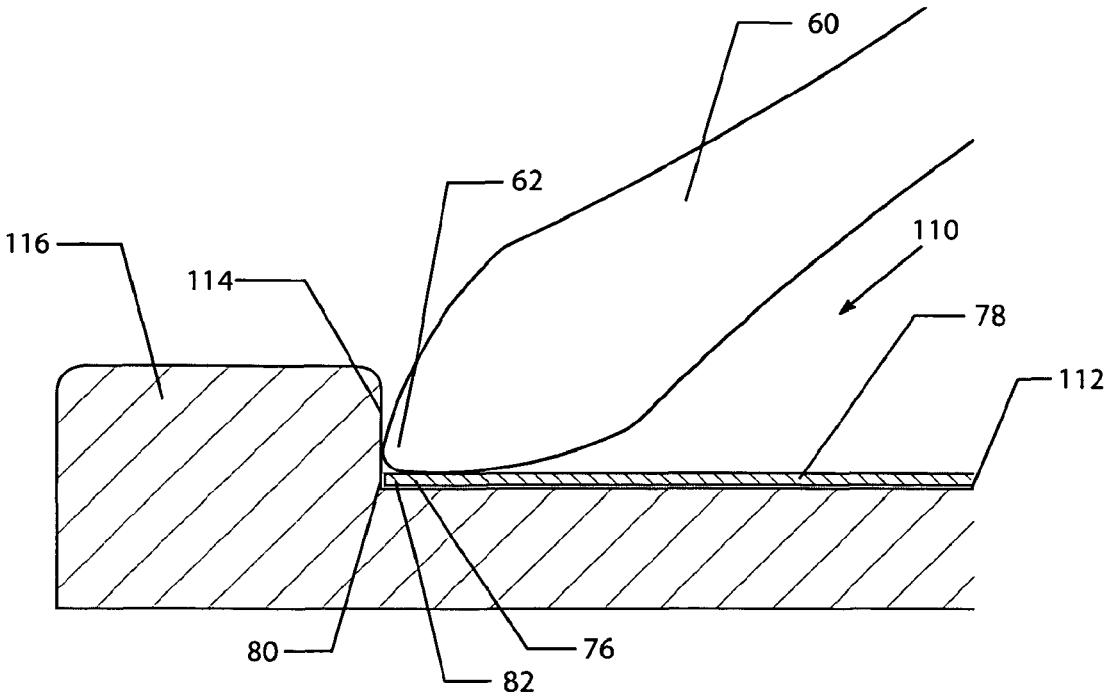
Fig. 6 (Prior Art)
FIG. 6 comprises (i) a fragmentary side elevation view, partially in section, of the distal portion of a scoring device resembling that of FIG. 1, except that no notches are present in the distal end wall of the scoring device; and (ii) a side elevation view of a working scoring tool poised to begin the scoring of cardstock or the like, the cardstock also being shown in fragmentary section view.

However, because the "point" of a scoring tool is rounded, it is virtually impossible for its distal end to make contact with the cardstock. Rather, the most distal portion of the underside of the tool point that makes contact with the cardstock is spaced by a short distance from the distal end of the point. This fact is illustrated in FIG. 6, which shows a fragment of the distal end of a representative scoring apparatus in section, and a tool poised above the platform for use in scoring a sheet of cardstock, also illustrated. For convenience, the scoring apparatus selected for illustration in FIG. 6 closely resembles that of FIG. 1 save that the apparatus of FIG. 6 has no notches in the distal end of the apparatus. Specifically, such scoring apparatus 110 is provided with a platform 112 whose distal edge terminates in an end wall 114 formed in a deck portion 116 of the apparatus 110. Cardstock 78 is placed on the platform 112 with its distal edge 80 in contact with end wall 114. The point 62 of scoring tool 60 abuts the end wall 114 at the beginning of a scoring run along the cardstock 78. Because of the rounded configuration of the point 62, the leading point of contact 76 of the point 62 with the cardstock 78 is spaced a short distance from the end wall 114, leaving a distal portion 82 of the cardstock 78 unscored when the tool 60 is moved from its distal limit in contact with end wall 114 proximally toward the user.

Figure 7:
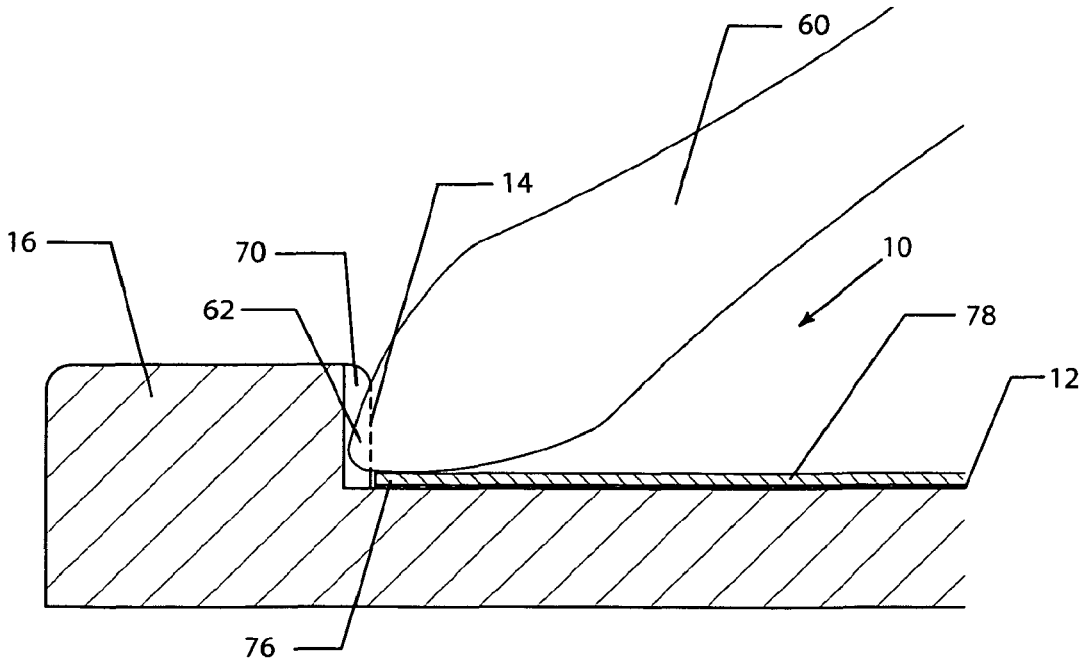
FIG. 7 comprises (i) a fragmentary side elevation view, partially in section, of the distal portion of the scoring device of FIG. 1; and (ii) a side elevation view of a working scoring tool poised to begin the scoring of cardstock or the like, the cardstock also being shown in fragmentary section view.

In contrast, because scoring apparatus 10 according to a preferred embodiment of the invention is provided with notches 70 in end wall 14, the point 62 of scoring tool 60 is able to move distally relative to the end wall 14 so that the leading point of contact 76 of the point 62 is coincident with the distal edge 80 of the cardstock 78. Accordingly, the scoring tool 60 is enabled to score the cardstock 78 completely, from its distal edge 80 proximally to the opposite edge (not illustrated) of the cardstock 78. The foregoing is illustrated in FIG. 7.

Desirably, the dimensions and configuration of the point 62 of the scoring tool 60 are designed to complement the dimensions of the notches 70 so that the point 62 may penetrate a given notch 70 sufficiently that the leading point of contact 76 of the underside of the point 62 is able to reach the distal edge 80 of the cardstock 78 when that edge 80 is in contact with the end wall 14.

The scoring device 10 and scoring tool 60 may be manufactured of strong rigid plastics material, using conventional molding and forming techniques. The propeller-shaped flow leader 74, shaped as a flat rise on the underside of the platform 12, is an artifact of the molding process; it corresponds in shape and dimensions to a counterpart shallow cavity in the mold (not illustrated), which latter facilitates flow of molten plastic to the underside portion of the platform 12 from the mold gate. The shape and dimensions of the flow leader, and the preferred position of the mold gate, are preferably determined with the assistance of a mold flow analysis, which will vary from one specific design to another. For the preferred embodiment of the inventive scoring device illustrated, a mold flow analysis indicated that the mold gate should be located off-centre relative to the horizontal dimensions of the device 10. In the molded product, the mold gate position corresponds to a generally circular rise 72 in the underside of the platform 12.

In use, the scoring device 10 is placed on a flat surface with the proximal end 28 nearest the user. A sheet of cardstock is placed on the platform 12. For cardmaking, the sheet is normally placed with its short edge abutting the distal end wall 14 and its long edge abutting the left sidewall 18. For boxmaking, the sheet is normally placed with its long edge abutting the distal end wall 14 and its short edge abutting the left sidewall 18.

The left side of the deck 16 serves as a flat surface against which the user's left hand may exert modest pressure on the scoring device 10 to stabilize it while it is being used. As the notches 70 are coincident with grooves 32 coinciding with scale divisions of the scale 36 or with special marks 42, 50 etc., the user can easily select the groove 32 to be used for scoring the cardstock (say). The working end 62 of the tool 60 is then used to score the cardstock, preferably beginning at an associated notch 70 and continuing proximally until the sheet of cardstock is scored across its entire width (or length) or to a desired distance from the end wall 14. The sidewall scales 22, 24 facilitate accurate termination of the score line if the scoring is to stop short of the proximal edge of the cardstock. Two or more score lines may be made for particular purposes while the cardstock is in place against the end wall 14 and the sidewall 18. Decorative embossing ("deco-embossing") may be accomplished by repeatedly scoring the underside of the presentation surface of the cardstock along oblique lines.

Preferably the width between the sidewalls 18, 20 is slightly longer than the maximum length or width of cardstock to be scored. This choice of width permits a left-handed user to place the right edge of the cardstock against the sidewall 20, which may make scoring the cardstock easier for such user. When selecting the preferred dimensions of the scoring device 10, there is a trade-off to be made between accommodation of cardstock of large dimensions, on the one hand, and cost of manufacture and ease of use for conventionally sized cardstock, on the other hand. Note that the height of sidewalls 18, 20 is preferably quite short so that if oversize cardstock is to be scored, part of the cardstock may overlie either sidewall with very little temporary deformation.

For diagonal scoring, opposed corners of the cardstock are aligned with one and the same groove 32.

It will be apparent that a device that imitates some but not all of the desirable design features of the scoring device herein described and illustrated may well be a useful scoring device within the scope of the invention. For example, a competitor might provide interruptions in the sidewalls 18, 20 without losing the benefit gained by having walls along both sides of the platform 12. The invention is not limited to the preferred embodiment herein described and illustrated, but is defined in scope by the appended claims.

What is claimed is:

1. Paper scoring apparatus comprising a. a platform providing a substantially planar rectangular work surface, having an underside, two side edges, a distal end and a proximal end, all with respect to a user;

b. a series of transversely spaced shallow score channels of substantially uniform breadth and depth extending longitudinally from the distal end of the work surface to the proximal end of the work surface; and c. shallow boundary walls extending upwardly from and along (i) the two side edges and (ii) the distal end of the platform, the boundary wall at the distal end of the platform having a series of spaced generally vertical notches mating with the series of score channels and extending upward from the distal ends as vertical extensions of corresponding score channels

2. Paper scoring apparatus as defined in claim 1, wherein the platform is of selected length and width suitable for use with rectangular paper of a known dimension.

3. Paper scoring apparatus as defined in claim 2, wherein the platform is of a length and width each exceeding the length of the rectangular paper of known dimension.

4. Paper scoring apparatus as defined in claim 2, including a scale along the edge of the distal end of the platform displaying length in selected units of length.

5. Paper scoring apparatus as defined in claim 4, wherein the scale is on a surface bevelled relative to the generally vertical surface of the distal end boundary wall.

6. Paper scoring apparatus as defined in claim 4, additionally including a scale along each of the side edges of the platform displaying length in the selected units of length.

7. Paper scoring apparatus as defined in claim 6, wherein the boundary walls are of substantially uniform height, the tops of the boundary walls are generally parallel to the platform, and the scales are located on or in the vicinity of the tops of the boundary walls.

8. Paper scoring apparatus as defined in claim 6, wherein at least some of the score channels are spaced from one another in multiples of the selected units of length.

9. Paper scoring apparatus as defined in claim 6, wherein at least some of the score channels are spaced from one another in simple fractions of the selected units of length.

10. Paper scoring apparatus as defined in claim 6, additionally including marks along the distal end boundary wall of the platform proximate the distal ends of selected score channels, for identifying score channels suitable for use in making predetermined preferred scoring.

11. Paper scoring apparatus as defined in claim 1, additionally including spaced reinforcing ribs on the underside of the platform, each rib underlying an associated groove for strengthening the platform in the vicinity of the associated groove.

*12. A paper scoring apparatus comprising:*

*a platform providing a substantially planar work surface having an underside, two side edges, a distal end, and a proximal end, all with respect to a user;*

*a series of transversely spaced shallow score channels of substantially uniform breadth extending longitudinally from the distal end of the work surface toward the proximal end of the work surface; and*

*a shallow boundary wall extending upwardly from a distal end of the two side edges along the distal end of the platform, the boundary wall at the distal end of the platform having a series of spaced generally vertical notches mating with the series of score channels and extending upward from the distal end as vertical extensions of corresponding score channels.*

*13. The paper scoring apparatus as defined in claim 12, wherein the platform has a length and width suitable for use with paper of known dimension.*

*14. The paper scoring apparatus as defined in claim 13, wherein the platform has a length or width exceeding the length or width of the paper of known dimension.*

*15. The paper scoring apparatus as defined in claim 13, further comprising a scale along an edge of the distal end of the platform displaying the length or width in selected units of measurement.*

*16. The paper scoring apparatus as defined in claim 15, wherein the scale is on a surface beveled relative to a surface of the distal end boundary wall.*

*17. The paper scoring apparatus as defined in claim 15, wherein the distal end boundary wall has a substantially uniform height, with the top of the boundary wall generally parallel to the platform and the scale located on or in the vicinity of the top of the boundary wall.*

*18. The paper scoring apparatus as defined in claim 15, wherein at least some of the score channels are spaced from one another in multiples of the selected units of measurement.*

*19. The paper scoring apparatus as defined in claim 15, wherein at least some of the score channels are spaced from one another in fractions of the selected units of measurement.*

*20. The paper scoring apparatus as defined in claim 15, further comprising marks along the distal end boundary wall of the platform proximate the distal ends of selected score channels that identify score channels suitable for use in making predetermined preferred scoring.*

*21. The paper scoring apparatus as defined in claim 13, further comprising a scale along a side edge of the platform displaying the length or width in selected units of measurement.*

*22. The paper scoring apparatus as defined in claim 12, further comprising spaced reinforcing ribs on the underside of the platform, wherein each rib underlies an associated score channel for strengthening the platform in the vicinity of the associated score channel.*

* * * * *